United States Patent
Imaoka (10) Patent No.: US 10,257,371 B2
(45) Date of Patent: Apr. 9, 2019

(54) TOUCH OPERATION DEVICE AND IMAGE FORMING DEVICE

(71) Applicant: KYOCERA Document Solutions Inc., Osaka-shi, Osaka (JP)

(72) Inventor: Kunio Imaoka, Osaka (JP)

(73) Assignee: KYOCERA DOCUMENT SOLUTIONS INC., Osaka-shi, Osaka (JP)

( * ) Notice: Subject to any disclaimer, the term of this patent is extended or adjusted under 35 U.S.C. 154(b) by 0 days.

(21) Appl. No.: 15/890,443

(22) Filed: Feb. 7, 2018

(65) Prior Publication Data
US 2018/0249026 A1    Aug. 30, 2018

(30) Foreign Application Priority Data
Feb. 24, 2017 (JP) ................. 2017-033361

(51) Int. Cl.
| G06F 3/12 | (2006.01) |
| H04N 1/00 | (2006.01) |
| G06F 3/041 | (2006.01) |
| G06F 3/0488 | (2013.01) |

(52) U.S. Cl.
CPC ....... *H04N 1/00392* (2013.01); *G06F 3/0412* (2013.01); *G06F 3/04883* (2013.01); *G06F 2203/04808* (2013.01)

(58) Field of Classification Search
CPC .......................... H04N 1/00392; G06F 3/0412
USPC ........................................................ 358/1.15
See application file for complete search history.

(56) References Cited

U.S. PATENT DOCUMENTS

| | | | |
|---|---|---|---|
| 2012/0099130 A1* | 4/2012 | Tohki | G03G 15/502 358/1.13 |
| 2013/0163023 A1* | 6/2013 | Tomono | H04N 1/00392 358/1.13 |
| 2013/0329239 A1 | 12/2013 | Hikichi | |
| 2014/0153014 A1* | 6/2014 | Kaneda | H04N 1/00448 358/1.12 |
| 2016/0198052 A1* | 7/2016 | Shogaki | H04N 1/00392 358/1.15 |

FOREIGN PATENT DOCUMENTS

JP       2013-258474 A    12/2013

* cited by examiner

*Primary Examiner* — Neil R McLean
(74) *Attorney, Agent, or Firm* — Viering, Jentschura & Partner mbB (57) ABSTRACT

A touch operation device includes a touch detection unit that detects a touch operation to a display unit and a touch operation control unit that controls the display unit in accordance with the touch operation that has been detected by the touch detection unit. The touch detection unit acquires touch operation information including information of the number of points that have been simultaneously touch-operated in the display unit and the touch operation control unit determines an operation screen that is displayed when the display unit returns from a sleep state, based on the touch operation information.

6 Claims, 8 Drawing Sheets

| NUMBER OF TOUCH OPERATION POINTS Tp | SHORTCUT OPERATION SCREEN |
|---|---|
| 1 | FIRST SHORTCUT OPERATION SCREEN Pt1 |
| 2 | SECOND SHORTCUT OPERATION SCREEN Pt2 |
| 3 | THIRD SHORTCUT OPERATION SCREEN Pt3 |

TOUCH OPERATION DEVICE AND IMAGE FORMING DEVICE

CROSS-REFERENCE TO RELATED APPLICATION

The disclosure of Japanese Patent Application No. 2017-33361 filed on Feb. 24, 2017, including the specification, drawings and abstract is incorporated herein by reference in its entirety.

BACKGROUND

The present disclosure relates to a touch operation device and an image forming device including the touch operation device.

In recent years, as an input device of an image forming device, a touch panel that detects a touch operation to a virtual key or button displayed on a display panel and outputs information indicating that the virtual key or button has been operated has been used.

Also, conventionally, for the purpose of reducing power consumption, if the image forming device has not been used continuously in a certain period, the image forming device is put in a sleep state in which power to each of units that form the image forming device is stopped or only power that is required for restart is supplied. When the image forming device is in a sleep state, image display of the display panel is also turned off.

SUMMARY

A touch operation device according to the present disclosure includes a display unit that displays an operation screen, a touch detection unit that detects a touch operation to the display unit, and a touch operation control unit that controls the display unit in accordance with the touch operation that has been detected by the touch detection unit. If the touch operation has not been performed for a certain time, the display unit is put in a sleep state in which display of an image is stopped, the touch detection unit acquires touch operation information including information of the number of points that have been simultaneously touch-operated in the display unit, and the touch operation control unit determines the operation screen that is displayed when the display unit returns from the sleep state, based on the touch operation information.

DETAILED DESCRIPTION

An image forming system according to embodiments will be described below with reference to the accompanying drawings. Each element of a configuration, an arrangement, or the like, described in the embodiments is not intended to limit the scope of the disclosure and is merely an illustrative example.

First Embodiment

Figure 1:
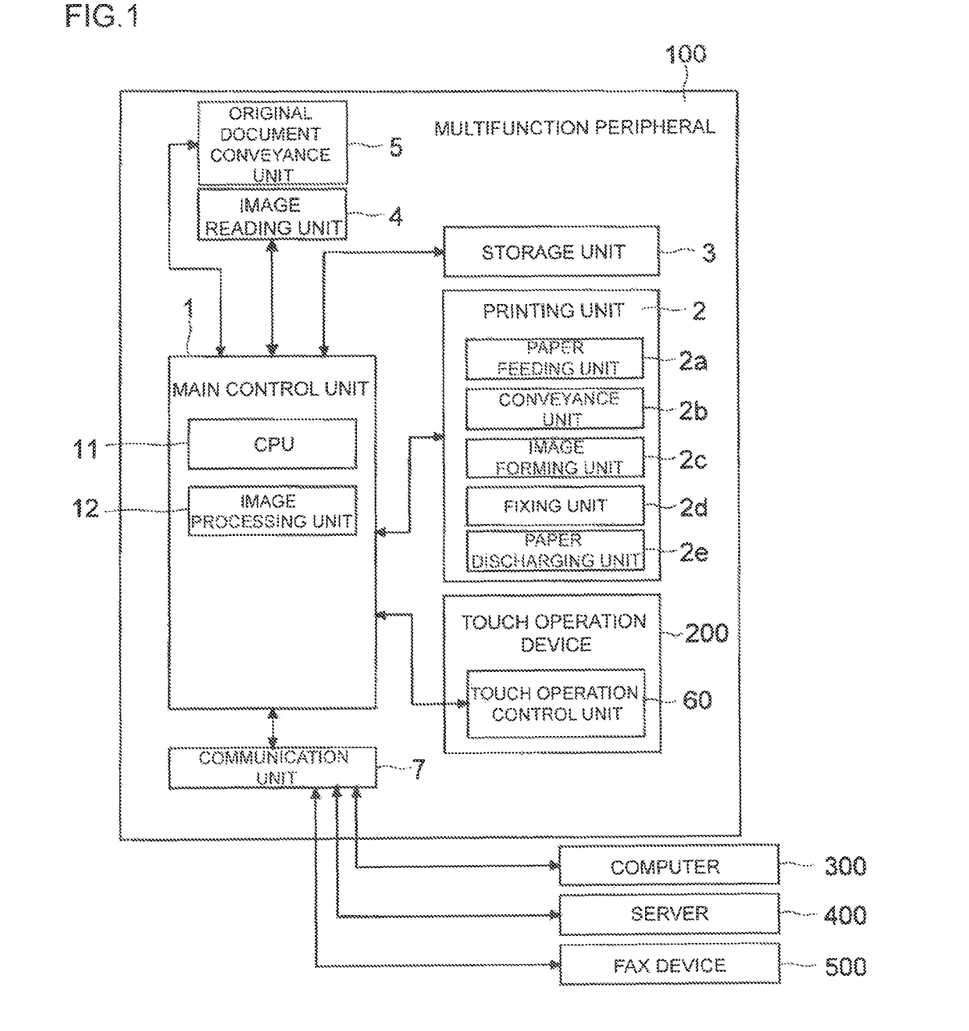
FIG. 1 is a function block diagram illustrating a main configuration of a multifunction peripheral including a touch operation device according to the present disclosure.
Figure 2:
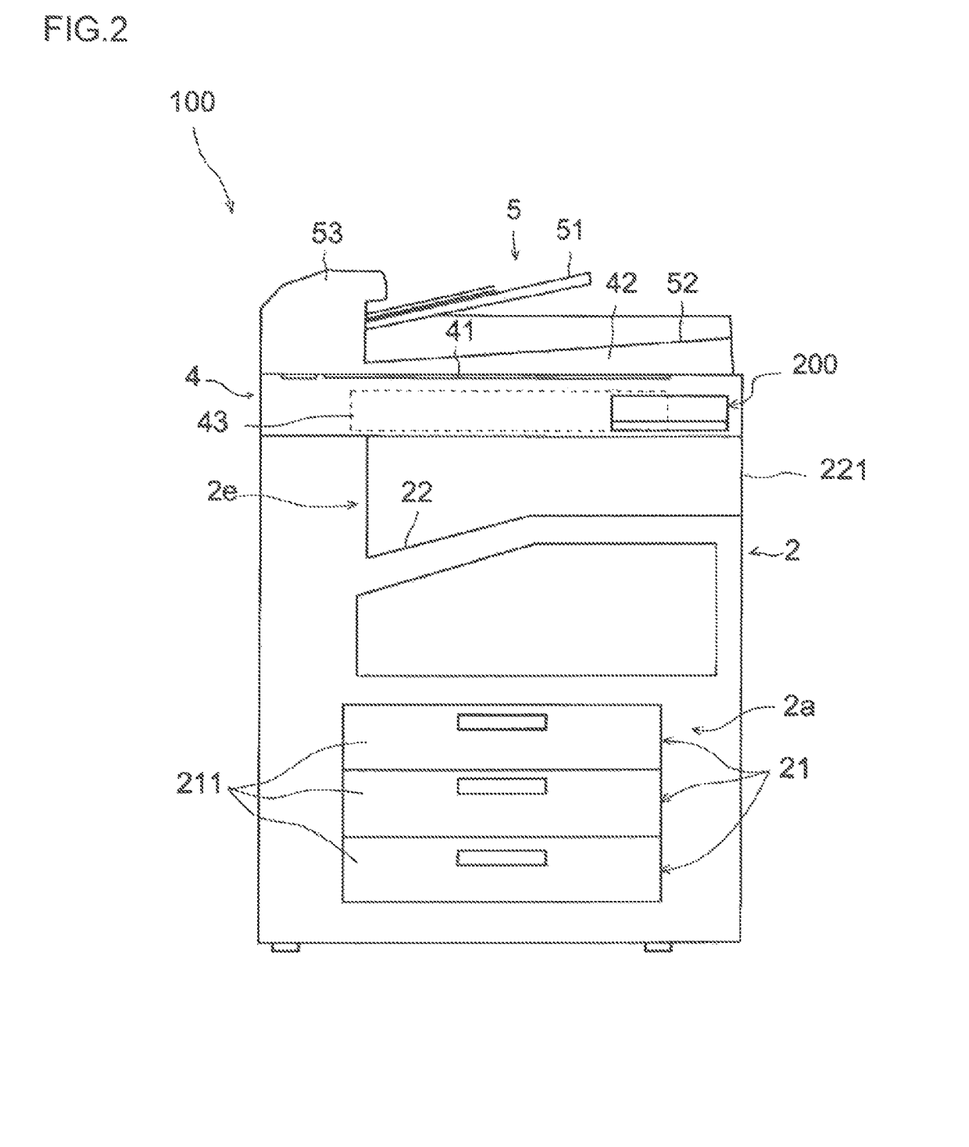
FIG. 2 is a view illustrating a schematic configuration of the multifunction peripheral illustrated in FIG. 1.
Figure 3:
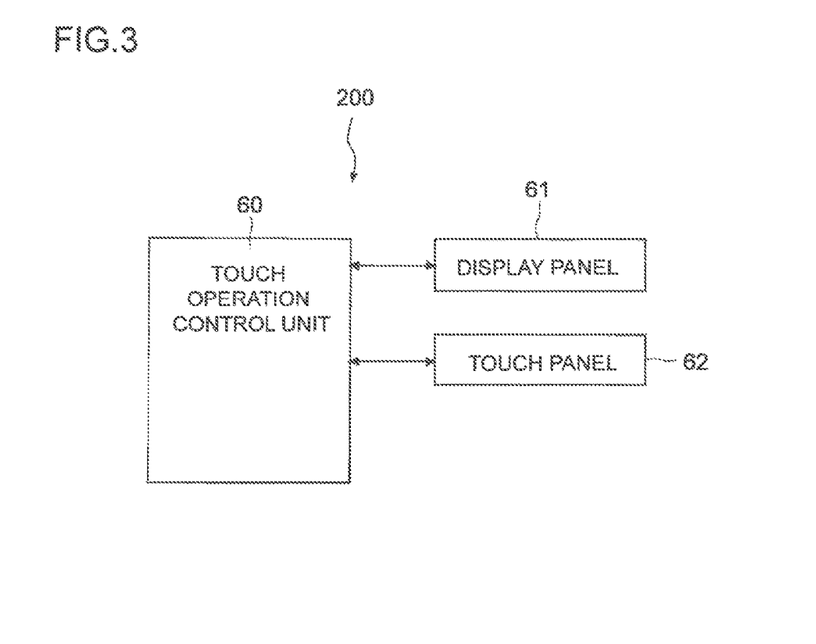
FIG. 3 is a block diagram illustrating a main configuration of a touch operation device.

FIG. 1 is a function block diagram illustrating a main configuration of a multifunction peripheral including a touch operation device according to the present disclosure. FIG. 2 is a view illustrating a schematic configuration of the multifunction peripheral illustrated in FIG. 1. FIG. 3 is a block diagram illustrating a main configuration of a touch operation device.

(Multifunction Peripheral 100)

A multifunction peripheral 100 is, for example, a multifunction peripheral including a plurality of functions, such as a copy function, a printer function, a scanner function, a FAX function, or the like.

As illustrated in FIG. 1 and FIG. 2, in the multifunction peripheral 100, a main control unit 1 (a main control substrate), a printing unit 2, and a storage unit 3 are provided. Also, the multifunction peripheral 100 includes an image reading unit 4, an original document conveyance unit 5, and a touch operation device 200. As illustrated in FIG. 2, in the multifunction peripheral 100, the image reading unit 4 is provided above the printing unit 2 and the original document conveyance unit 5 is provided above the image reading unit 4. Also, the multifunction peripheral 100 includes a communication unit 7.

The main control unit 1 performs the entire control of the multifunction peripheral 100. The main control unit 1 includes a CPU 11. Also, in the multifunction peripheral 100, the storage unit 3 including a nonvolatile memory, such as ROM, HDD, flash ROM, or the like, and a volatile memory, such as RAM, is provided. The storage unit 3 stores a program or data related to control. The main control unit 1 controls each unit using the program or data of the storage unit 3. The main control unit 1 controls scanning, printing, transmission, and storage of image data which are performed when a job, such as copying, transmission, or the like, is performed.

(Main Control Unit 1)

In the main control unit 1, an image processing unit 12 that performs image processing, based on image data that is output from the image reading unit 4, image data that has been transmitted from a computer 300, a server 400, a FAX device 500, or the like via the communication unit 7 is provided. The image processing unit 12 reads contents of image included in image data. For example, when the image data is photograph data, the image processing unit 12 is able to distinguish a shape, a color, or the like of an object included in a photographed image.

(Printing Unit 2)

The printing unit 2 includes a paper feeding unit 2a, a conveyance unit 2b, an image forming unit 2c, a fixing unit 2d, and a paper discharging unit 2e. The paper feeding unit 2a supplies a sheet of paper. The conveyance unit 2b conveys a sheet of paper and discharges a printed sheet of paper to the outside of the main control unit 1. The image forming unit 2c forms a toner image, based on image data, and transfers the toner image to a sheet of paper that is conveyed. The fixing unit 2d fixes the transferred toner image on the sheet of paper. The main control unit 1 controls an operation of the printing unit 2.

As illustrated in FIG. 2, the paper feeding unit 2a includes a plurality of paper cassettes 21. In the plurality of paper cassettes 21, sheets of paper are stored. At least one of the size and the direction of sheets of paper stored in each of the plurality of paper cassettes 21 is different from that of each of the other ones of the plurality of paper cassettes 21. The main control unit 1 selects a proper size, direction, or the like of a sheet of paper, based on an instruction of a user. Then, the main control unit 1 selects one of the paper cassettes 21 in which proper sheets of paper are stored. Then, the paper feeding unit 2a delivers a sheet of paper from the selected paper cassette 21 in accordance with an instruction from the main control unit 1. As illustrated in FIG. 2, the paper cassettes 21 are drawable forward (toward a front side of a paper surface of FIG. 2) from a front face side of the multifunction peripheral 100 and a holding unit 211 projects forward.

As illustrated in FIG. 2, a discharging tray 22 is provided in a gap between the printing unit 2 and the image reading unit 4 and a sheet of paper on which an image is fixed by the fixing unit 2d is discharged to the discharging tray 22 by the paper discharging unit 2e. The discharging tray 22 includes an opening 221 at a right side of the multifunction peripheral 100.

(Image Reading Unit 4)

The image reading unit 4 reads an image of an original document that has been loaded on an upper surface of an image reading unit case, based on control of the main control unit 1, and generates image data. As illustrated in FIG. 2, the image reading unit 4 includes a contact glass 41 (an original document platen) on which an original document is placed. The image reading unit 4 further includes an openable and closable original document platen cover 42 that presses an original document placed against the contact glass 41 and a reading mechanism 43 that reads each image of the original document placed on the contact glass 41 or an original document that is conveyed to the contact glass 41.

(Original Document Conveyance Unit 5)

The original document conveyance unit 5 conveys an original document to the contact glass 41 of the image reading unit 4, based on control of the main control unit 1. The original document conveyance unit 5 includes an original document mounting table 51 on which an original document is placed, an original document discharging unit 52 to which an original document from which an image has been read is discharged, and an original document conveyance mechanism 53 (See FIG. 2). The original document conveyance mechanism 53 includes a paper feeding roller, a conveyance roller, and the like, which are not illustrated. The original document conveyance mechanism 53 delivers original documents that are placed on the original document mounting table 51 one by one to convey each of the original documents to the contact glass 41 by driving the paper feeding roller and the conveyance roller. Each of the original documents, which has been conveyed to the contact glass 41, is read by the reading mechanism 43, and then, is discharged to the original document discharging unit 52.

Furthermore, the original document conveyance unit 5 includes a hinge (not illustrated) in a part thereof located at a back side of the paper surface of FIG. 2. The original document conveyance unit 5 rotationally moves with the hinge serving as a center such that a front part of the original document conveyance unit 5 moves close to or away from the contact glass 41. A front side of the original document conveyance unit 5 is moved upward to open up an upper surface of the contact glass 41, and thereby, the user can place an original document on the surface of the contact glass 41. Also, in a state in which an original document is placed on the upper surface of the contact glass 41, the front part of the original document conveyance unit 5 is moved close to the contact glass 41. Thus, the original document is pressed against the contact glass 41 and the image reading unit 4 is able to correctly read the original document.

In the multifunction peripheral 100, the image reading unit 4 optically reads an original document that has been conveyed by the original document conveyance unit 5 or an original document that has been placed on the contact glass 41 and generates image data. The Image data that has been generated by the image reading unit 4 is stored in the storage unit 3 mounted in the multifunction peripheral 100, a computer couple to the multifunction peripheral 100 via a network, or the like.

(Communication Unit 7)

The communication unit 7 is coupled to the computer 300, such as PC, the server 400, the FAX device 500, and the like via a wired and (or) wireless network, a public line, or the like, so as to be communicable.

(Touch Open Device 200)

As illustrated in FIG. 3, the touch operation device 200 includes a touch operation control unit 60, a display panel 61, and a touch panel (a touch detection unit) 62. The touch operation control unit 60 is a control unit that controls the touch operation device 200. The touch operation control unit 60 has a similar configuration to that of the main control unit 1. The touch operation control unit 60 controls operations of the display panel 61 and the touch panel 62. The display panel 61 is able to display an image and, for example, includes a liquid crystal panel or the like. The display panel 61 is controlled by the touch operation control unit 60 and, for example, an operation screen, such as a key, a button, or the like, which is used in operating the multifunction peripheral 100, information that is provided to the user, or the like is displayed on the display panel 61.

The touch panel 62 detects a touch position of an indication body, such as a finger of the user or the like, on the display panel 61. The touch panel 62 is a so-called multi-touch-sensitive device and is able to detect that a plurality of indication bodies simultaneously touches the display panel 61. The touch operation control unit 60 recognizes, based on an output of the touch panel 62, an operation screen that has been operated among the operation screens, such as a key or a button, which are displayed on the display panel 61. Then, the touch operation control unit 60 is able to transmit information of a job associated with the key or the button that has been operated to the main control unit 1. Note that the jobs that have been recognized by an operation of the touch panel 62 include an operation (a job) of the multifunction peripheral 100 and a job of operating the touch operation device 200 itself. Thus, the touch operation control unit 60 transmits, for the job (for example, a scanning start, a printing start, or the like) of the multifunction peripheral 100, information of the determined job to the main control unit 1 and does not transmit, for a switching operation for an operation of the touch operation device 200 (for example, switching of an operation screen, change of setting of the touch operation device 200 itself), the information of the job to the main control unit 1.

(Operation of Touch Operation Device)

Figure 4:
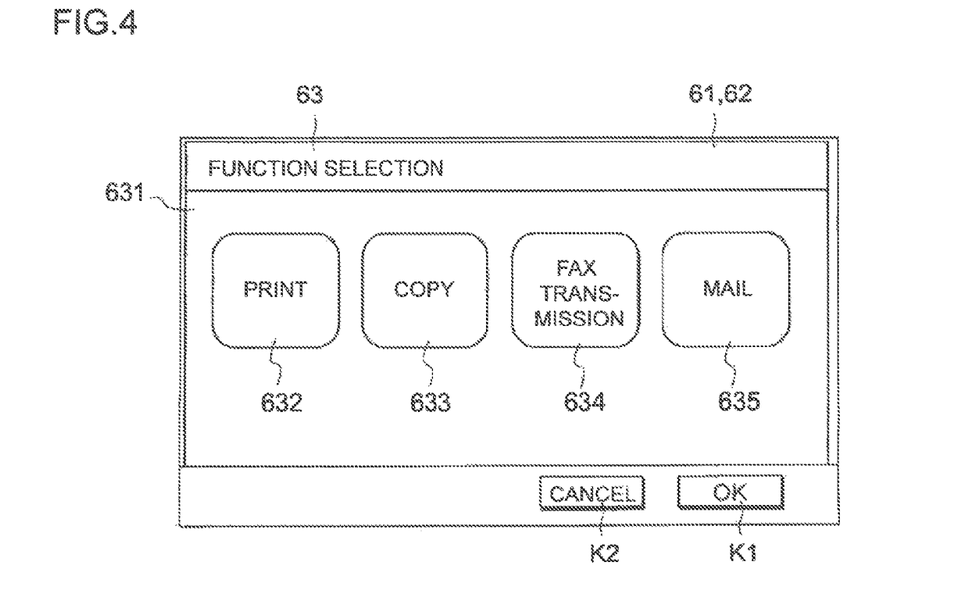
FIG. 4 is an initial screen that is displayed on a display panel of a touch operation device.
Figure 5:
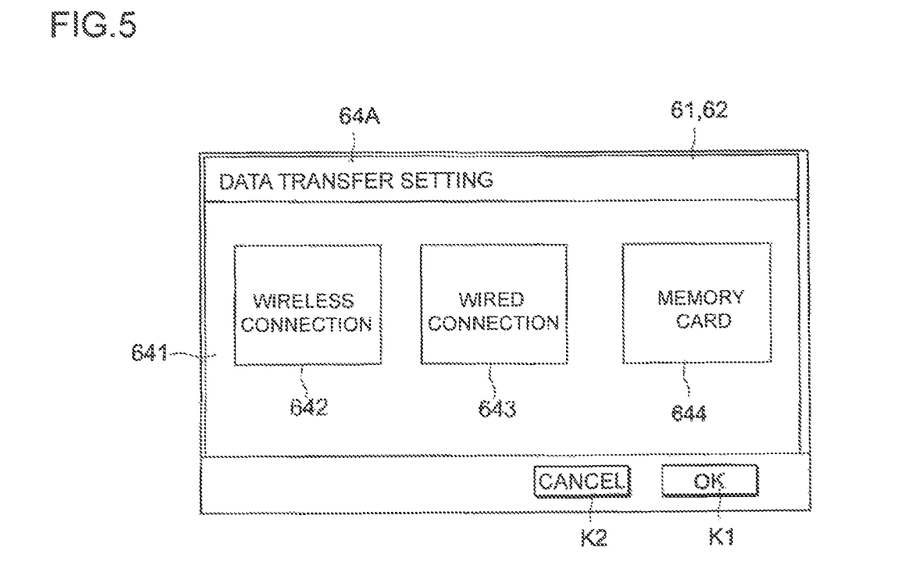
FIG. 5 is an operation screen to which the initial screen has been switched by a touch operation to the initial image illustrated in FIG. 4.
Figure 6:
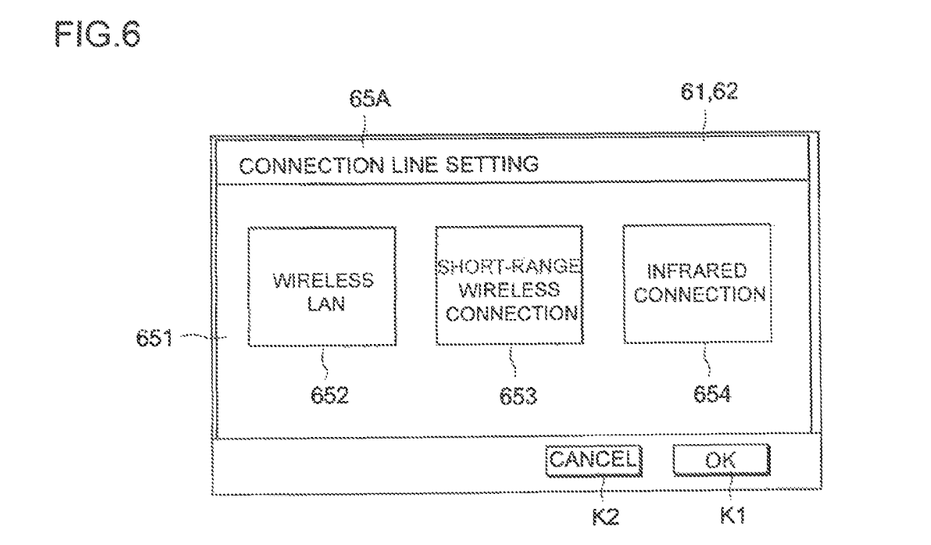
FIG. 6 is an operation screen to which the operation screen has been switched by a touch operation to the operation screen illustrated in FIG. 5.

An operation of the touch operation device 200 will be described. FIG. 4 is an initial screen that is displayed on a display panel of a touch operation device. FIG. 5 is an operation screen to which the initial screen has been switched by a touch operation to the initial image illustrated in FIG. 4. FIG. 6 is an operation screen to which the operation screen has been switched by a touch operation to the operation screen illustrated in FIG. 5. In this embodiment, a case in which normal printing (a print mode) has been selected by a touch operation and a wireless connection has been selected as a data transfer method will be described with reference to an operation screen that is displayed by the display panel 61. In the following description, a setting screen that is used is a screen that is used for performing setting of the multifunction peripheral 100 and (or) the touch operation device 200 by operating the touch operation device 200. Therefore, the setting screen is one of operation screens.

If the multifunction peripheral 100 has been continuously in an unused state, the printing unit 2, the storage unit 3, the image reading unit 4, the original document conveyance unit 5, and the touch operation device 200 are stopped or are put in a sleep state in which only some of functions are in a running state to reduce power consumption. The touch operation device 200 is in a sleep state in which display of the display panel 61 is stopped but detection of a touch operation by the touch panel 62 is enabled. That is, when the touch operation device 200 is in a sleep state, an image is not displayed on the display panel 61 but a touch operation by the touch panel 62 is enabled.

Then, when, while the multifunction peripheral 100 is in a sleep state, a touch operation on the display panel 61 by the user is performed, the multifunction peripheral 100 including the touch operation device 200 returns from the sleep state. Note that, in the touch operation device 200, immediately after power of the multifunction peripheral 100 is turned on or when the touch operation device 200 returns from a sleep state, normally, an initial screen 63 illustrated in FIG. 4 is displayed on the display panel 61.

As illustrated in FIG. 4, the initial screen 63 includes a function display unit 631 on which a function that can be performed in the multifunction peripheral 100, an OK key K1, and a cancel key K2. Also, the function display unit 631 includes, for example, keys that are used for selecting operation modes of a print mode key 632, a copy mode key 633, a FAX mode key 634, a mail sending mode key 635.

Then, when the print mode key 632 is selected by the user and then the OK key K1 is operated, the multifunction peripheral 100 is put in a print mode. In the print mode, in the multifunction peripheral 100, image data that is stored in a mobile terminal, such as a smartphone, a tablet PC, or the like, which is owned by the user, is printed on a sheet of paper. In the multifunction peripheral 100, it is necessary to determine a method for moving (transferring) the image data that is stored in the mobile terminal to the multifunction peripheral 100. Therefore, when the multifunction peripheral 100 is switched to a print mode, a data transfer setting screen 64A (see FIG. 5), which is an operation screen used for data transfer, is displayed on the display panel 61.

In the multifunction peripheral 100, for transfer of the image data from the mobile terminal of the user to the multifunction peripheral 100, a wireless connection using a radio wave, an infrared ray, or the like, a wired connection that directly connects a cable to the mobile terminal, or a recording medium, such as a memory card or the like, which is attachable and removable, may be used. Therefore, a function display unit 641 of the data transfer setting screen 64A includes a wireless connection setting key 642, a wired connection setting key 643, and a memory card reading setting key 644. The data transfer setting screen 64A also includes the OK key K1 and the cancel key K2. Note that, in this embodiment, it is assumed that a wireless communication is selected.

When the wireless connection setting key 642 is selected and then the OK key K1 is operated, the display of the display panel 61 transitions to a wireless setting screen 65A. The wireless setting screen 65A is a screen that is used for determining a connection method that is used for wirelessly connects the mobile terminal of the user and the multifunction peripheral 100. That is, a function display unit 651 of the wireless setting screen 65A includes a wireless LAN selection key 652, a short-range wireless selection key 653, and an infrared selection key 654.

The wireless LAN selection key 652 is selected when image data is transferred using a wireless connection. The short-range wireless selection key 653 is selected when image data is transferred using a communication standard which enables exchange of data in a short range, which has been mounted in many mobile terminals in recent years. The infrared selection key 654 is selected when image data is transferred using an infrared connection.

Figure 7:
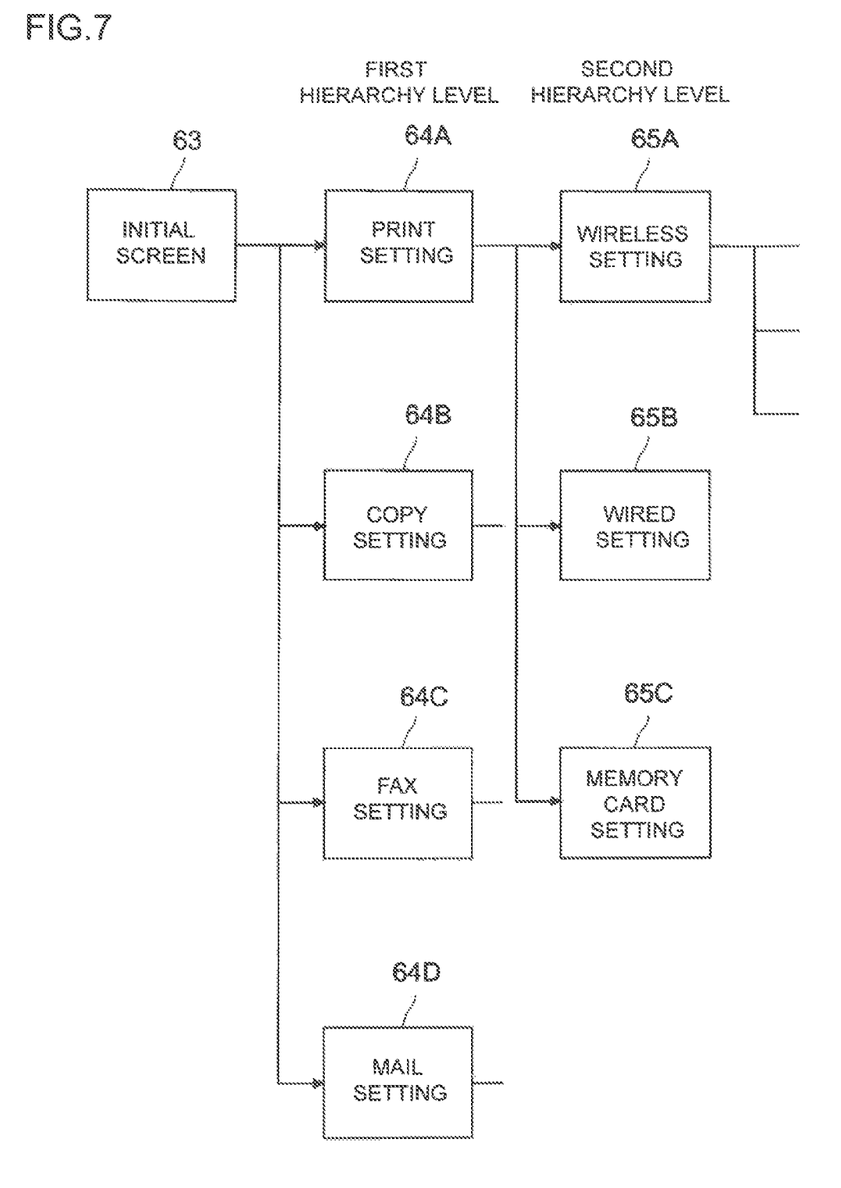
FIG. 7 is a diagram illustrating a concept of a hierarchical menu display.

In the above-described example, in the touch operation device 200, a touch operation is performed to cause a transition to a next operation screen. In the operation screen after the transition, a touch operation is performed to cause a further transition to a next operation screen to occur. That is, in the touch operation device 200, a so-called hierarchical menu in which a key in the operation screen is selected and the OK key K1 is operated to cause a transition to a next operation screen to occur is used. Details of the hierarchical menu will be described below. FIG. 7 is a diagram illustrating a concept of a hierarchical menu display.

In a conceptual diagram illustrated in FIG. 7, a plurality of rectangles and directional lines each of which connects corresponding ones of the rectangles are indicated. As illustrated in FIG. 7, the initial screen 63 is at a left end. An arrow points to an operation screen to which the initial screen 63 is caused to transition by a touch operation. That is, the initial screen 63 transitions in a following manner. The print mode key 632 is selected to cause a transition to the data transfer setting screen 64A to occur, the copy mode key 633 is selected to cause a transition to a page setting screen 64B to occur, the FAX mode key 634 is selected to cause a transition to a transmission destination selection screen 64C to occur, and the mail sending mode key 635 is selected to cause a transition to a transmission destination selection screen 64D to occur. The screens that are displayed by a single screen transition from the initial screen 63 are at a first hierarchy level.

Then, the wireless connection setting key 642 of the data transfer setting screen 64A is selected to cause a transition to the wireless setting screen 65A to occur, the wired connection setting key 643 is selected to cause a transition to a wired setting screen 65B to occur, and the memory card reading setting key 644 is selected to cause a transition to a memory card setting screen 65C to occur. The screens that are displayed by two screen transitions from the initial screen 63 are at a second hierarchy level. Note that, in FIG. 7, only screens to which the data transfer setting screen 64A transitions are indicated as operation screens in the second hierarchy level, but there is also a case in which operation screens to which each of the page setting screen 64B, the transmission destination selection screen 64C, and the transmission destination selection screen 64D transitions are included in the operation screens in the second hierarchy level. Also, in FIG. 7, the hierarchical menu up to the second hierarchy level is indicated, but there is also a case in which further more hierarchy levels are included.

In the hierarchical menu, in order to cause the display panel 61 to display an operation screen at the first hierarchy level, starting from the initial screen 63, a single touch operation is needed to be performed. Similarly, in order to cause the display panel 61 to display an operation screen at the second hierarchy level, starting from the initial screen 63, two touch operations are needed to be performed. That is, in the hierarchical menu display, in order to cause an operation screen at an nth hierarchy level to be displayed, starting from the initial screen 63, n touch operations are needed to be performed.

In many cases, the user causes the multifunction peripheral 100 to return from a sleep state and uses the multifunction peripheral 100. The multifunction peripheral 100 has many functions in order to increase general purpose property. In the multifunction peripheral 100, in order to enable a user who is not used to an operation to execute a predetermined operation, the hierarchical menu is employed for the touch operation device 200. On the other hand, there may be also a case in which a user who is used to an operation frequently uses some of functions of the multifunction peripheral 100. Assuming a case in which the user who is used to an operation uses a function that the user frequently uses, when the hierarchical menu display is used, the number of times the user performs a touch operation is increased and the user may feel bothered by operating the hierarchical menu display.

Therefore, in the touch operation device 200 according to the present disclosure, it is possible to perform, when the multifunction peripheral 100 returns from a sleep state, a shortcut operation in which an operation screen that has been determined regardless of a hierarchy level is displayed based on information at a point (which will be hereinafter referred to as a touch operation point) which has been touch-operated by the user. The touch operation point is a point at which an indication body (for example, a finger of the user) which is used by the user has touched the display panel 61 (the touch panel 62). For example, when an index finger and a thumb of the user touch the display panel 61, there are two touch operation points. As the information of the touch operation point, in this embodiment, information of the number of points that have been touch-operated is used. Note that information of the touch operation point may include information other than the number of points.

(Shortcut Operation)

Figure 8:
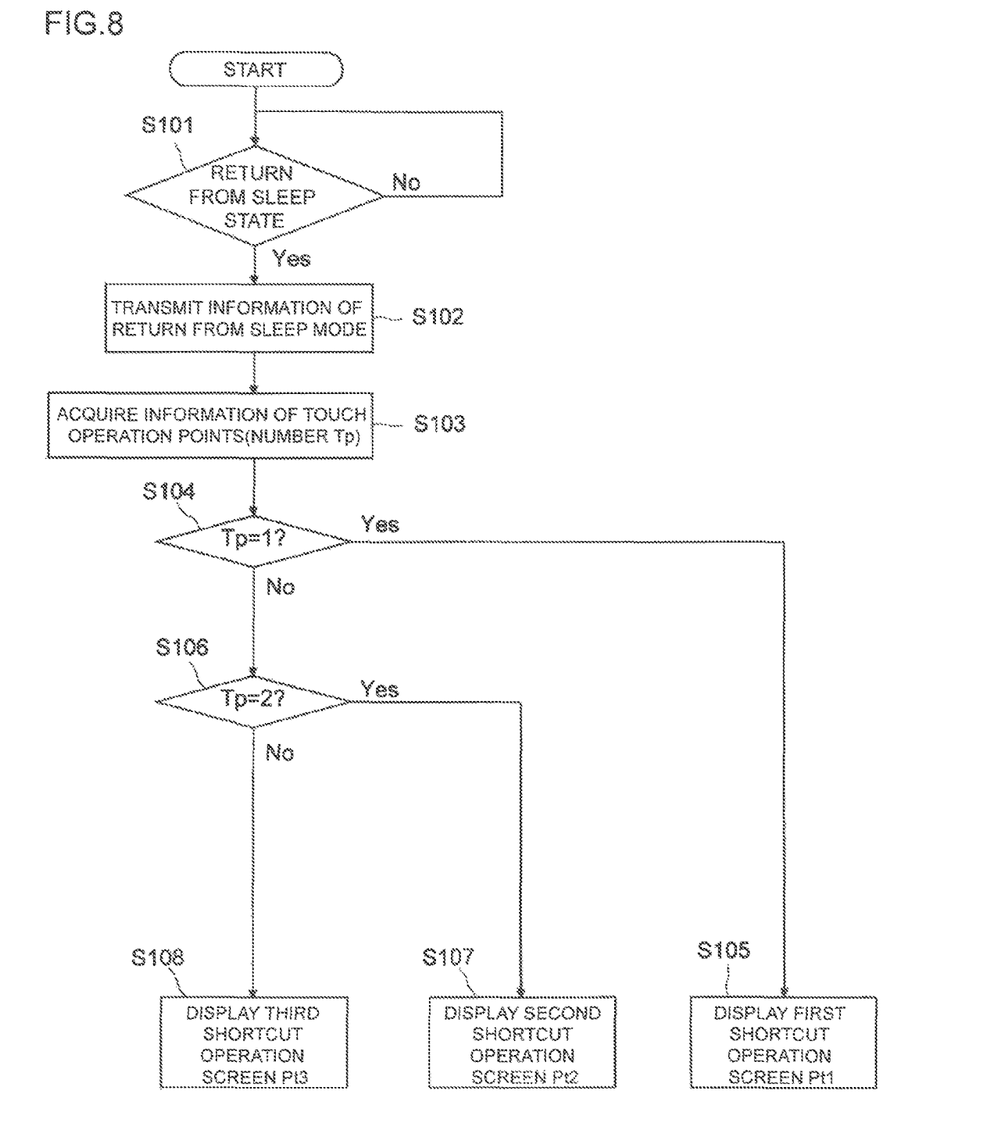
FIG. 8 is a flowchart illustrating steps used for performing a shortcut operation.

A shortcut operation of the touch operation device 200 according to the present disclosure will be described below. FIG. 8 is a flowchart illustrating steps used for performing a shortcut operation. Note that, a case in which, as the number of touch operation points, 1, 2, and 3 are indicated will be described, but the present disclosure is not limited thereto. There may be a case in which more touch operation points are indicated, or there may be a case in which only 1 and 2 are indicated.

Figure 9:
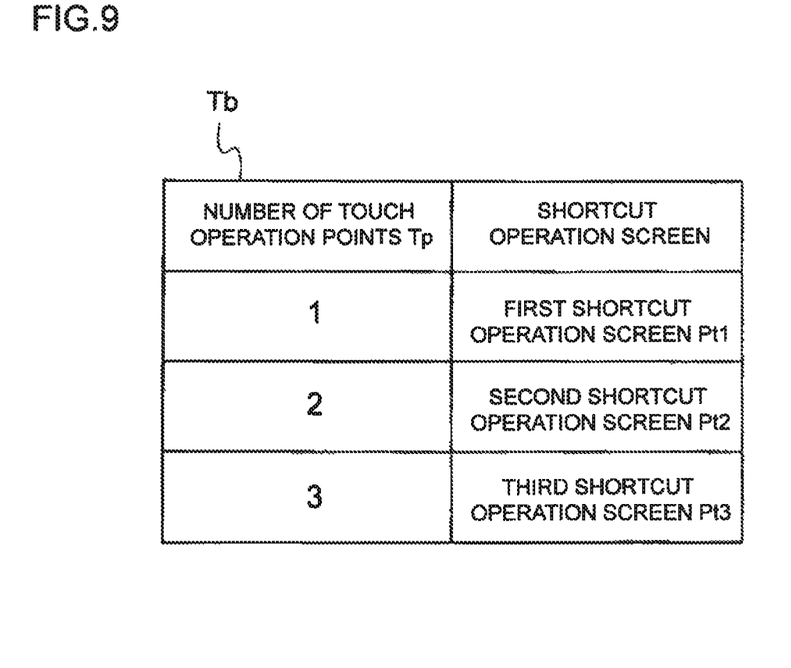
FIG. 9 is a data table stored in a touch operation control unit, which is a comparative table in which the number of user touch operation points and a shortcut operation screen displayed by a shortcut operation are associated with one another.

FIG. 9 is a data table Tb stored in the touch operation control unit 60, which is a comparative table in which the number Tp of touch operation points for the display panel 61 and a shortcut operation screen displayed by a shortcut operation are associated with one another. As illustrated in FIG. 9, in the data table Tb, the number Tp of touch operation points is 1, a first shortcut operation screen Pt1 is associated, when the number Tp of touch operation points is 2, a second shortcut operation screen Pt2 is associated, and the number Tp of touch operation points is 3, a third shortcut operation screen Pt3 is associated. Note that the operation screen that is associated with the number Tp of touch operation points may be determined in advance, and also, may be set by the user.

First, the touch operation control unit 60 waits until a touch operation by the user is performed on the display panel 61 (the touch panel 62) (Step S101). Before a touch operation is performed, the multifunction peripheral 100 including the touch operation device 200 is in a sleep state. Therefore, if a touch operation by the user has been executed on the display panel 61 (YES in Step S101), the touch operation control unit 60 acquires information indicating that the touch operation has been performed from the touch panel 62 and transmits the information indicating that the touch operation has been performed to the main control unit 1 (Step S102). When the main control unit 1 receives the information indicating that the touch operation has been performed, the main control unit 1 causes the multifunction peripheral 100 to return from the sleep state. Note that return of the multifunction peripheral 100 from a sleep state has been known and the description thereof will be omitted.

Then, the touch operation control unit 60 acquires information (the number Tp of touch operation points) of touch operation points of the user (Step S103). The information of touch operation points is transmitted from the touch panel 62 to the touch operation control unit 60. Note that the order of transmission of the information indicating that one or more touch operations have been performed (Step S102) and acquisition of the information of the one or more touch operation points (Step S103) may be reversed, and also the transmission and the acquisition may be simultaneously performed.

The touch operation control unit 60 compares the data table Tb included therein and each touch operation point to one another. Then, whether or not the number Tp of touch operation points is 1 is checked (Step S104). If the number Tp of touch operation points is 1, that is, if a finger of the user has performed a touch operation at a single point on the display panel 61 (YES in Step S104), the touch operation control unit 60 displays the first shortcut operation screen Pt1 on the display panel 61 (Step S105).

If the number Tp of touch operation points is not 1 (NO in Step S104), the touch operation control unit 60 checks whether or not the number Tp of touch operation points is 2 (Step S106). If the number Tp of touch operation points is 2, that is, if fingers of the user have performed touch operations at two points on the display panel 61 (YES in Step S106), the touch operation control unit 60 displays the second shortcut operation screen Pt2 on the display panel 61 (Step S107).

If the number Tp of touch operation points is not 2 (NO in Step S106), the touch operation control unit 60 determines that the number Tp of touch operation points is 3 and displays the third shortcut operation screen Pt3 on the display panel 61 (Step S108).

Note that there is a case in which a user who is not used to an operation operates the touch operation device 200, that is, the multifunction peripheral 100, and also, there is a case in which the touch operation device 200 returns from a sleep state, based on a touch operation of such a user. For the user who is not used to an operation, it is preferable that a touch operation is started from the initial screen 63. That is, for the user who is not used to an operation, it is preferable that, when the touch operation device 200 returns from a sleep state, the initial screen 63 is displayed. Therefore, one of the first shortcut operation screen Pt1, the second shortcut operation screen Pt2, and the third shortcut operation screen Pt3 may be set to be the initial screen 63.

For example, the first shortcut operation screen Pt1 when the number Tp of touch operation points is 1 may be set to be the initial screen 63. Also, for example, a configuration in which a physical button, such as an operation start button, is provided in advance, when the touch operation device 200 is caused to return from a sleep state by the physical button, the initial screen 63 is displayed, and, in other cases, such as when the touch operation device 200 is caused to return from a sleep state by a touch operation, the shortcut operation screen is displayed may be employed. In such a configuration, when the touch operation device 200 returns from the sleep state, it is possible to display the initial screen 63 and also to display an operation screen that is desired by the user in accordance with the number Tp of touch operation points.

As described above, in the touch operation device 200, the user who is not used to an operation starts an operation from the initial screen 63 and thereby is able to execute a desired function in accordance with operation detailed steps. Also, a user who is used to an operation does not have to repeat the same operation each time the touch operation device 200 returns from a sleep state, and therefore, the user feels less bothered by performing the operation.

In the touch operation device 200 according to the present disclosure, the shortcut operation screen that is displayed when the touch operation device 200 returns from a sleep state is changed in accordance with the number Tp of touch operation points. Thus, the user is able to display an operation screen associated with a function, which the user frequently uses on a routine basis, by a single touch operation. Thus, convenience of the user may be increased.

Note that the first shortcut operation screen Pt1, the second shortcut operation screen Pt2, and the third shortcut operation screen Pt3 do not merely indicate operation screens. That is, the first shortcut operation screen Pt1, the second shortcut operation screen Pt2, and the third shortcut operation screen Pt3 are screens that are reached by repeating a plurality of number of touch operations starting from the initial screen 63. Then, there is a case in which, in an operation screen that is displayed in the middle of repeating the touch operation, a numeric value or a condition is set. Before each of the first shortcut operation screen Pt1, the second shortcut operation screen Pt2, and the third shortcut operation screen Pt3 is reached from the initial screen 63, the corresponding one of the first shortcut operation screen Pt1, the second shortcut operation screen Pt2, and the third shortcut operation screen Pt3 may be caused to include contents of a setting item that has been set by the user.

Second Embodiment

Figure 10:
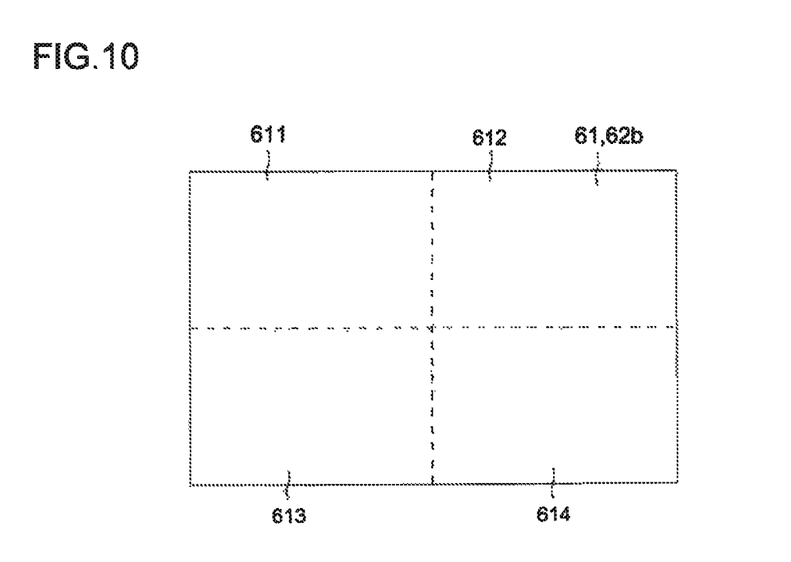
FIG. 10 is a view illustrating a display panel and a touch panel of a touch operation device according to a second embodiment.

Another example of a touch operation device according to the present disclosure will be described with reference to the accompanying drawings. FIG. 10 is a view illustrating a display panel and a touch panel of a touch operation device according to a second embodiment. A touch operation device 200 of the second embodiment is the same as the touch operation device 200 of the first embodiment, except that a touch panel 62b is different.

As illustrated in FIG. 10, the touch panel 62b is able to detect one or more touch operation points in a first area 611, a second area 612, a third area 613, a fourth area 614, which have been obtained by dividing the display panel 61 into four parts. Note that, similar to the touch panel 62, the touch panel 62b is able to detect 1, 2, and 3 as the number Tp of touch operation points. That is, the touch panel 62b transmits, as information of the one or more touch operation points, information including the number Tp of touch operation points and one or more areas which have been touch-operated to the touch operation control unit 60.

Figure 11:
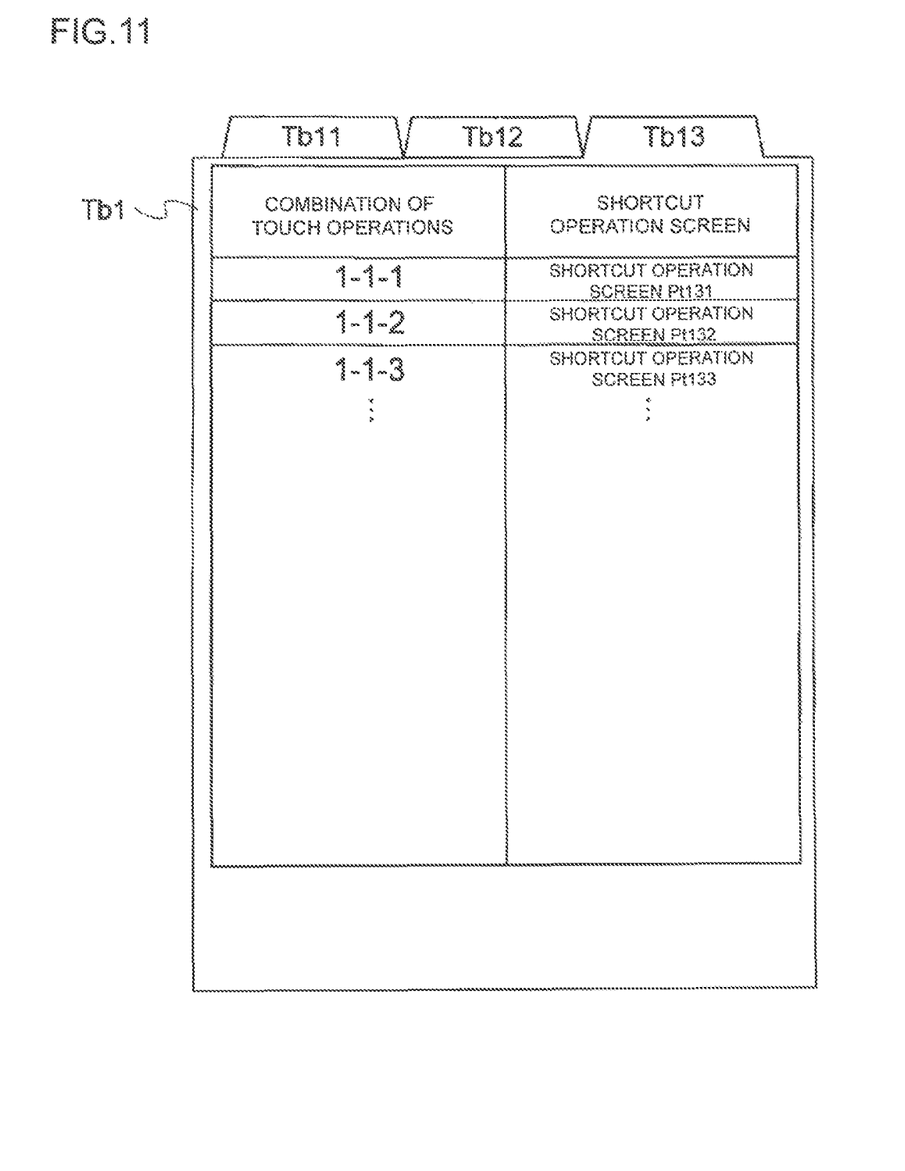
FIG. 11 is a view illustrating a data table in which the number of touch operation points and a shortcut operation screen are associated with one another.

In this embodiment, the touch panel 62b is able to increase combinations of touch operations by combining each of 1, 2 and 3, each of which is the number Tp of touch operation points, and each area (1, 2, 3, or 4) in which a touch operation point has been detected, as compared to a case in which only the number of touch operation points is the information of the touch operation. Combinations of the number of touch operation points and area that have been touched-operated will be described with FIG. 11. FIG. 11 is a view illustrating a data table in which the number of touch operation points and each shortcut operation screen are associated with one another.

A data table Tb1 illustrated in FIG. 11 includes a plurality of sub-tables in accordance with the number Tp of touch operation points. That is, the data table Tb1 includes a first sub-table Tb11 when the number Tp of touch operation points is 1, a second sub-table Tb12 when the number Tp of touch operation points is 2, and a third sub-table Tb13 when the number Tp of touch operation points is 2. Note that, in the data table Tb1 illustrated in FIG. 11, for convenience of description, the three sub-tables Tb11 to Tb13 are displayed so as to overlap one another and tabs that respectively indicate the sub-tables Tb11 to Tb13 are displayed so as not to overlap one another in upper ends of the sub-tables Tb11 to Tb13. Then, in the data table Tb1 illustrated in FIG. 11, a state in which a sub-table to which the touch operation control unit 60 refers is displayed uppermost is illustrated. That is, in the data table Tb1 illustrated in FIG. 11, the third sub-table Tb13 is displayed uppermost and it is indicated that the touch operation control unit 60 refers to the third sub-table Tb13.

As illustrated in FIG. 11, in the data table Tb1, area numbers (1, 2, 3, and 4 in this case) of the areas that have been touch-operated are indicated with a hyphen interposed between the are numbers. For example, when the number Tp of touch operation points is 3, two touch operation points have been detected in the first area 611, and shortcut operation point has been detected in the fourth area 614, in the data table Tb1, "1-1-4" is displayed. Also, although illustration is omitted, when the number Tp of touch operation points is 2, similar applies, and, for example, "1-1" is displayed when both of two touch operation points are in the first area 611.

The number of combinations of touch operation points of the third sub-table Tb13 illustrated in FIG. 11 will be described. In the third sub-table Tb13, the number Tp of touch operation points is 3. Then, possible patterns of three touch operation points are divided into a case in which all of the three touch operation points are in the same area, a case in which two of the three touch operation points are in the same area and one of the three touch operation points is in a different area, and a case in which all of the three touch operation points are in different areas.

There are four patters of the combinations of touch operations in the case in which all of the three touch operation points are in the same area. Also, as touch operation patterns in the case in which two of the three touch operation points are in the same area, there are four patterns in which there are two of the touch operation points in the same area, and there are three patterns in which the rest one of the touch operation points is in a different area from an area in which there are the two of the touch operation points for each of the patterns in which two of the three touch operation points are in the same area. Therefore, there are 12 patterns of combinations of touch operations in the case in which two of the touch operation points are in the same area. Also, there are four patterns of combinations of touch operations when all of three touch operation points are in different areas. That is, when the number Tp of touch operation points is 3, there are 20 patterns of the combinations of touch operations.

Also, when the number Tp of touch operation points is 2, there are ten patterns of combinations of touch operations. When the number Tp of touch operation points is 1, there are four patterns of combinations of touch operations. That is, for the touch panel 62b, when the number Tp of touch operation points is 1, 2, or 3 and there are four areas in which a touch operation is possibly detected, there are 34 patterns of combinations of touch operations.

Similar to the first embodiment, the touch operation device 200 of this embodiment is able to cause one of operation screens included in a hierarchical menu display to be stored in each of touch operations in 34 patterns. Note that it is not necessary to use all of the touch operations in 34 patterns. For example, a touch operation is difficult to be performed depending on the size of a hand, a dominant hand, or the like, and therefore, such a touch operation that is difficult to be performed is not necessarily used.

When there are many combinations of touch operations, the combinations of touch operations may be allocated to a plurality of people and thus used. For example, touch operations are simultaneously performed at three points in the first area 611, and thereby, a one-operation screen that has been set by a user A, in other words, a one-operation screen that is frequently used by the user A, is displayed. As another example, a touch operation is performed at one point in each of the first area 611, the third area 613, and the fourth area 614, and thereby, a one-operation screen that has been set by a user B, in other words, a one-operation screen that is frequently used by the user B, is displayed. Thus, even when a single touch operation device 200, that is, a single multifunction peripheral 100, is used by a plurality of people, display of the shortcut operation that is set for each of the plurality of people on the display panel 61 by a single touch operation may be enabled.

As described above, it is possible to associate an increased number of shortcut operation screens with corresponding touch operations, by detecting each of the number of touch operation points and an area of each touch operation point by the touch panel 62b. Also, different users are registered as users who use the touch operation device 200, that is, the multifunction peripheral 100, and thereby, even when the users share and use the touch operation device 200, that is, the multifunction peripheral 100, an operation screen that is desired by each of the users may be displayed by a single touch operation, and thus, the convenience of the users may be increased.

Note that, when a user performs a touch operation, in the display panel 61, image display is in a stopped state. Therefore, there is a case in which it is hardly to distinguish boundary lines between the four areas 611, 612, 613, and 614. In order to enable the user to confirm the areas, then, a display that indicates the boundary lines between the areas may be provided in the display panel 61. A display of each boundary line may be indicated by a viewable line only when image display is stopped in the display panel 61. Also, a display of each boundary line may be a display of a triangle, an arrow, or the like, which is provided at the corresponding one of sides of a rectangular opening that is provided in a cover that covers a front side of the display panel 61 in order to observe the display panel 61, and indicates the each boundary line.

Also, in this embodiment, the shortcut operation in which, when the number Tp of touch operation points is any one of 1, 2, and 3, the shortcut operation screen is displayed in accordance with one of more touch operations is performed, but the present disclosure is not limited thereto. For example, a configuration in which, only when the number Tp of touch operation points is 3, the shortcut operation in which the shortcut operation screen associated with touch operations is displayed at the time of returning from a sleep state is performed and, when the number Tp of touch operation points is 2 or 1, the initial screen 63 is displayed at the time of returning from a sleep state may be employed.

Furthermore, although, in this embodiment, as the number Tp of touch operation points, three numbers, that is, 1, 2, and 3, are indicated, more than three numbers Tp of touch operation points may be indicated, and also, two or less numbers Tp of touch operation points may be indicated. The number Tp of touch operation points may be changeable in a range in which the touch panel 62 (62b) is able to detect touch operation points. For example, when the touch panel 62 (62b) is able to detect up to six touch operation points, the number Tp of touch operation points may be changeable between the numbers of 1 to 6. The number Tp of touch operation points may be arbitrarily changed by a user, and also, may be changed by the touch operation control unit 60 in accordance with a registration condition of the shortcut operation screen. For example, a configuration in which, when there is no longer any combination of touch operations, which is not associated with the shortcut operation screen, or when the number of the combinations is less than a fixed number, the touch operation control unit 60 increases the number Tp of touch operation points may be employed.

An example of a touch operation device according to the present disclosure includes a display unit (61) that displays an operation screen, a touch detection unit (62) that detects a touch operation on the display unit (61), and a touch operation control unit (60) that controls the display panel (61) in accordance with the touch operation that has been detected by the touch panel (62), the display panel (61) is put in a sleep state, if a touch operation has not been performed for a certain time, in which a display of an image is suspended, the touch panel (62) acquires touch operation information including information of the number Tp of points that have been simultaneously touch-operated in the display panel (61), and the touch operation control unit (60) determines, based on the touch operation information, an operation screen (Pt1, Pt2, Pt3) which is displayed when the display panel (61) returns from the sleep state.

With the above-described configuration, a user who is not used to operating a touch operation device is able to easily execute a desired operation by sequentially switching operation screens, and a user who is used to operating the touch operation device is able to cause an operation screen that is frequently used by the user to be displayed on the display unit by less touch operations. Thus, for each of users at different operation skill levels in operating the touch operation device, an operation screen with which a job that is desired by the user may be easily and reliably displayed. Thus, a touch operation device that is easy to operate and less bothering for many users may be provided.

In the above-described configuration, the display panel (61) may be divided into a plurality of areas (611, 612, 613, and 614), and the touch panel (62b) may be configured to further acquire information of the areas (611, 612, 613, and 614) in which points that have been touch-operated are included and acquire, as touch operation information, information obtained by combining information of the number Tp of points that have been touch-operated and the areas (611, 612, 613, 614) in which the points that have been touch-operated are included. With this configuration, as compared to a case in which operation screens are switched based on only the number Tp of points that have been touch-operated, the number of patterns of touch operations is increased. Thus, it is possible to determine each of many shortcut operation screens, and thus, the convenience of a user may be increased. Also, when a plurality of users shares the touch operation device, because there are many patterns of touch operations, it is possible to display an operation screen that is desired by each user by performing a less number of touch operations, as compared to a case in which each of the users performs an operation once or a case in which each of the users performs an operation from an initial image.

In the above-described configuration, in the display panel (61), a boundary line that divides the display panel (61) into a plurality of areas may be indicated.

In the above-described configuration, the touch operation control unit may be configured to store a plurality of operation screens in combination with respective pieces of touch operation information respectively, and also, the touch operation control unit may be configured to determine, based on the touch operation information from the touch detection unit, an operation screen from the plurality of operation screens.

In the above-described configuration, the touch operation control unit may be configured to be able to change the operation screens that have been stored in combination with the plurality of pieces of touch operation information.

Although embodiments of the present disclosure have been described above, the scope of the present disclosure is not limited thereto and various modifications and changes may be made to those embodiments without departing from the gist of the present disclosure.

The present disclosure may be used for an operation device including a touch panel that is used for operating an image forming device.

What is claimed is:

1. A touch operation device comprising:
a display unit that displays an operation screen;
a touch detection unit that detects a touch operation to the display unit; and
a touch operation control unit that controls the display unit in accordance with the touch operation that has been detected by the touch detection unit,
wherein, if the touch operation has not been performed for a certain time, the display unit is put in a sleep state in which display of an image is stopped,
the touch detection unit acquires touch operation information including information of the number of points that have been simultaneously touch-operated in the display unit, and
the touch operation control unit determines the operation screen that is displayed when the display unit returns from the sleep state, based on the touch operation information.

2. The touch operation device according to claim 1,
wherein the display unit is divided into a plurality of areas, and
the touch detection unit further acquires information of the areas in which the points that have been touched-operated are included and acquires, as the touch operation information, information in which information of the number of points that have been touch-operated and information of the areas in which the points that have been touched-operated are included are combined.

3. The touch operation device according to claim 2,
wherein a boundary line that divides the display unit into the plurality of areas is indicated in the display unit.

4. The touch operation device according to claim 1,
wherein the touch operation control unit stores a plurality of operation screens in combination with different pieces of the touch operation information respectively, and
the touch operation control unit determines, based on the touch operation information from the touch detection unit, the operation screen from the plurality of operation screens.

5. The touch operation device according to claim 4,
wherein the touch operation control unit is able to change the operation screens stored in combination of the plurality of pieces of the touch operation information.

6. An image forming device comprising:
a printing unit that prints an image on a recording medium;
a control unit; and
the touch operation device according to claim 1,
wherein the touch operation control unit generates an operation signal, based on the touch operation, and transmits the operation signal to the control unit, and the control unit controls the printing unit, based on the operation signal.

* * * * *